United States Patent
Zino et al.

(10) Patent No.: US 7,502,458 B2
(45) Date of Patent: Mar. 10, 2009

(54) SYSTEM AND METHOD FOR CALL ROUTING THROUGH A DATA NETWORK

(75) Inventors: Galeal Zino, Plainsboro, NJ (US); Tom Evslin, Princeton, NJ (US); Brad Miller, Cranbury, NJ (US)

(73) Assignee: ITXC IP Holdings S.a.r.l., Luxembourg ( * ) Notice: Subject to any disclaimer, the term of this patent is extended or adjusted under 35 U.S.C. 154(b) by 965 days.

(21) Appl. No.: 10/161,830

(22) Filed: Jun. 4, 2002

(65) Prior Publication Data

US 2003/0012356 A1    Jan. 16, 2003

Related U.S. Application Data

(63) Continuation-in-part of application No. 09/326,927, filed on Jun. 5, 1999, now Pat. No. 6,404,864.

(51) Int. Cl.
*H04M 7/00* (2006.01)

(52) U.S. Cl. .................. 379/220.01; 370/356

(58) Field of Classification Search ............ 379/220.01, 379/221.01, 221.05, 273; 370/356
See application file for complete search history.

(56) References Cited

U.S. PATENT DOCUMENTS

| 5,406,620 A * | 4/1995 | Pei ........................ 379/221.02 |
| 5,727,051 A * | 3/1998 | Holender ............... 379/112.05 |
| 6,731,626 B1 * | 5/2004 | Neyman .................... 370/352 |

* cited by examiner

*Primary Examiner*—Alexander Jamal
(74) *Attorney, Agent, or Firm*—Kaplan Gilman Gibson & Dernier LLP

(57) ABSTRACT

In some embodiments, the present invention provides a distributed monitoring, evaluation and routing ("DiMER") system capable of active management of data network-based telephony. Such a system, and data network-based telephony incorporating the same, advantageously routes calls to meet call quality standards, connection speed and/or cost goals, among other targets. To meet such quality standards, the system incorporates preferences with periodically obtained call-related data and analysis, and revises call routing, as appropriate, by shifting or reallocating call traffic between available terminating gateways (based on their performance and caller preferences).

11 Claims, 10 Drawing Sheets

SYSTEM AND METHOD FOR CALL ROUTING THROUGH A DATA NETWORK

This Application is a Continuation-in-part of U.S. patent application Ser. No. 09/326,927, filed Jun. 5, 1999, now U.S. Pat. No. 6,404,894, issued Jun. 11, 2002.

FIELD OF THE INVENTION

The present invention relates to data network telephony, and more particularly, to a system and method for call routing through a data network including monitoring, evaluating and actively managing telephone-call quality in data network-based telephony networks.

BACKGROUND OF THE INVENTION

Data networks such as the Internet are now being used to transmit voice communications. Such data network-based telephony networks provide an efficient alternative to public-switched telephone networks ("PSTNs") for placing telephone calls.

FIG. 1 depicts a schematic diagram of a system 100 for voice communications over a data network in the prior art. The system includes data network 102 and public-switched telephone networks ("PSTN") 120 and 122. The specifics of the architectures and communication protocols of such systems are not described herein except to note that they are quite different from one another such that direct communication therebetween is not possible. It will be appreciated that while two PSTNs (i.e., PSTN 120 and PSTN 122) are depicted, functionally there is only one worldwide PSTN.

Communication between a PSTN and a data network is implemented via a "gateway." A gateway is an entrance to and an exit from a communications network. A gateway is typically an electronic repeater device that intercepts and translates signals from one network to another. A gateway often includes a signal conditioner that filters out unwanted noise and control characters. In data networks, gateways are typically a "node" on both networks that connects two otherwise incompatible networks. Thus, gateways often perform code and protocol conversions. Such an operation would be required for communication between a PSTN and a data network. Assuming an analog voice signal is delivered from the PSTN, the gateway digitizes that signal from the PSTN and encodes and transmits it as "packets" (hereafter "digitized voice signal") over the data network according to data network protocols. In other embodiments, the signal from the PSTN is a digital signal, such that analog-to-digital conversion is not required. Protocol conversion is still required.

An element associated with a gateway is a "gatekeeper." A gatekeeper is responsible for gateway registration, address resolution and the like. A gatekeeper may be viewed as the router that directs a digitized voice signal to a "terminating" gateway (i.e., a gateway that provides protocol conversion for transmission over a PSTN, for example, to a telephone). As used herein, the term "gateway" includes both the gateway and gatekeeper functions.

System 100 therefore also includes gateway 110 that acts as a conduit between PSTN 120 and data network 102, and gateway 112 serving as a conduit between data network 102 and PSTN 122. The system further includes telephone 130 that is connected, via link t1, to PSTN 120 and telephone 136 that is connected, via link t8, to PSTN 122. The links that are depicted in FIGS. 1 and 2 are, as is well known, trunk lines, trunk groups, etc., as appropriate.

In operation, voice message 140 from telephone 130 is transmitted over link t1 to PSTN 120. Within PSTN 120, voice message 140 is routed to switch S2 over link L2. Switch S2, the operation of which is well known in the art, will typically route voice message 140 to another switch (not shown) over a trunk group (not shown). In such a manner, voice message 140 moves through PSTN 120 being routed from switch to switch until it is carried over a final link L3 out of PSTN 120. Voice message 140 is then carried over link t4 to gateway 110.

"Originating" gateway 110 performs protocol conversion and digitizes, as required, voice signal 140. Voice message 140 is then routed (the gatekeeper's function) into data network 102. For clarity of presentation, the voice message will be assigned the same reference numeral (e.g., 140), notwithstanding the fact that the signal carrying the message is physically changed during transmission through the system.

Message 140 is transmitted over call path DNCP to (call-) "terminating" gateway 112 wherein the signal leaves data network 102. Note that the designation "originating" or "terminating" applies on a call-by-call basis. In other words, for a first call, a particular gateway can be an originating gateway, while for a second call, that same gateway can be a terminating gateway. Moreover, packets typically flow in both directions since both parties typically talk.

A call path through a data network, such as call path DNCP through data network 102, is not fixed according to a defined hierarchy as in a PSTN. Rather, an originating gateway "selects" a terminating gateway and the voice signal is routed by successive network elements (e.g., routers, bridges, etc.) through the data network to the terminating gateway. Since routing decisions are made by each network element, call path DNCP is not a priori known or set.

Gateway 112 receives digitized voice message 140 and converts it to a form suitable for transmission through PSTN 122. Voice message 140 is delivered over link L5 to PSTN 122. Within PSTN 122, voice message 140 is routed via over links, such as link L6, to switches, such as switch S4. Voice message 140 is carried over link L7 out of PSTN 122 to link t8 to telephone 136 to complete the call.

Such prior art systems typically suffer from significant drawbacks. Perhaps the most significant drawback is that on some data networks, such as the Internet, there are no means by which a call (e.g., voice) quality is monitored and actively managed. As such, a need exists for a data-network-based telephony system that efficiently transmits telephone calls while actively managing the quality of such transmissions.

SUMMARY OF THE INVENTION

In some embodiments, the present invention provides a distributed monitoring, evaluation and routing ("DiMER") system that provides active management of a data network-based telephony network. Among other benefits, the DiMER system enhances voice quality of telephone calls that are placed over such networks.

In accordance with the present teachings, such a system, and data network-based telephony networks incorporating the same, advantageously route calls to meet call-quality standards and/or cost goals, among other targets. Telephony networks in accordance with the present invention advantageously comprise the DiMER system, PSTNs, gateways and a data network.

In data network-based telephony networks, problems can arise within the data network of any of a plurality of network elements, or, alternatively, at gateways themselves. Unlike PSTNs, which have a rigid, well-defined routing hierarchy, no fixed call route is a priori defined through a data network. As such, identifying a problematic network element, and rerouting to avoid such an element, is difficult.

In accordance with the present invention, the cause of problems arising within the data network is "ignored" for routing purposes. Rather, in the present invention, routing is addressed by focusing on the originating and terminating gateways. This approach is advantageously used because call routes over a data network to different terminating gateways are typically different. Thus, even through the route to a terminating gateway is not a priori known, whatever route is taken, that route is reasonably assumed to be uniquely associated with that gateway. As such, if compromised performance or a failed call attempt is detected, the terminating gateway (which is known) is the focus, regardless of the actual location of the problem (which can be hard to locate).

In view of the foregoing, and in accordance with the present teachings, the network is operated/administered/managed (i.e., operating goals for the network, whether they be cost, quality or other targets, are achieved) by shifting or reallocating call traffic between available terminating gateways based on system performance.

To implement such an approach, "problem" gateways must be identified. In the embodiments described herein, such identification is performed by (1) obtaining call-related data (hereinafter "call metrics") from gateways via a "data acquisition element;" and (2) adopting a mode of analysis that readily identifies such problem gateways. In the illustrated embodiments, the analysis function is advantageously performed by an "analysis element" via a mode of analysis referred to herein as "banding." It will be understood that "banding," which is described later in this Specification, is simply one of a variety of suitable approaches for data analysis as may occur to those skilled in the art in view of the present teachings, and that such other methods may suitably be used.

Once a mode of analysis is adopted (e.g., "banding"), call metrics are advantageously organized or processed into a form that is useful for that mode of analysis. Moreover, having identified "problem" gateways, data must be organized in a way that facilitates shifting call traffic between acceptable gateways to meet quality standards or other goals.

To that end, and in accordance with an embodiment of the present invention, "portfolios" are generated. Each portfolio indicates, for a particular "DNIS," the percent allocation or routing of call-traffic to "acceptable" gateways (i.e., gateways that can accept calls in the DNIS). Briefly, the term "DNIS" refers to a collection of digits within a telephone number than can be used to identify telephone numbers having such digits as belonging to a particular group or "dialing plan." For example, "732" can be a DNIS. Further description of DNIS is provided later in this Specification.

An initial call-traffic allocation within a portfolio is developed by a network administrator based on internal policy considerations (e.g., cost, quality, etc.). Changes are made in each portfolio (i.e., shifting the allocation of call traffic among the various acceptable terminating gateways) as a function of recent network performance (as indicated by the collected and processed call metrics) among any other parameters, to meet the business objectives of the network administrator. In some embodiments, such allocation is based on "best value routing." Which considers both call quality and cost in the allocation calculus. Such changes are made by a "routing element." The changes may be periodic or upon the occurrence of prescribed events. The changes are repeatedly made in response to the network recognizing increasing or decreasing levels of performance by various terminating gateways.

Once a new allocation is established within the portfolio, such allocation must be implemented. An illustrative methodology presented herein for implementing the revised allocation involves using historical data that provides a breakdown of call traffic for each DNIS by "sub-DNIS" (i.e., the next significant digit following the DNIS). Sub-DNISes are "allocated" to each gateway (i.e., telephone numbers within the sub-DNIS are routed to an appropriate gateway) as required to satisfy the desired call traffic allocation.

According to a further aspect of the invention, a file of caller preferences is established for utilization in call routing allocation in combination with acquired historical data. Caller preferences are established for such telephony parameters as cost of telephone transmission, speed of connectivity, transmission quality, etc. Another such parameter may include contractual requirements. For example, there could be a preexisting contract requiring a minimum, maximum, or average number of minutes or calls of traffic to be sent to particular gateways. Combining caller preferences with prior call completion data enables the system to increase efficiency.

Additionally, callers or carriers may specify a desired quality of service (QoS). The desired QoS is then ascertained by the switch local to the calling party, passed to the originating gateways, and accounted for in the routing allocations.

Other aspects of the present invention will become clear from the following Detailed Description of the Preferred Embodiments and the accompanying drawings.

DETAILED DESCRIPTION OF THE PREFERRED EMBODIMENTS

For clarity of explanation, the illustrative embodiments of the present invention are presented as a collection of individual functional blocks. The functions that such blocks represent can be provided using either shared or dedicated hardware, including, without limitation, hardware capable of executing software. Illustrative embodiments may comprise digital signal processor hardware, read-only memory (ROM) for storing software performing the operations described below, random-access memory (RAM) for storing DSP results and for storing collected-call information, and non-volatile memory for storing pre-established rules for evaluating call quality.

Figure 1:
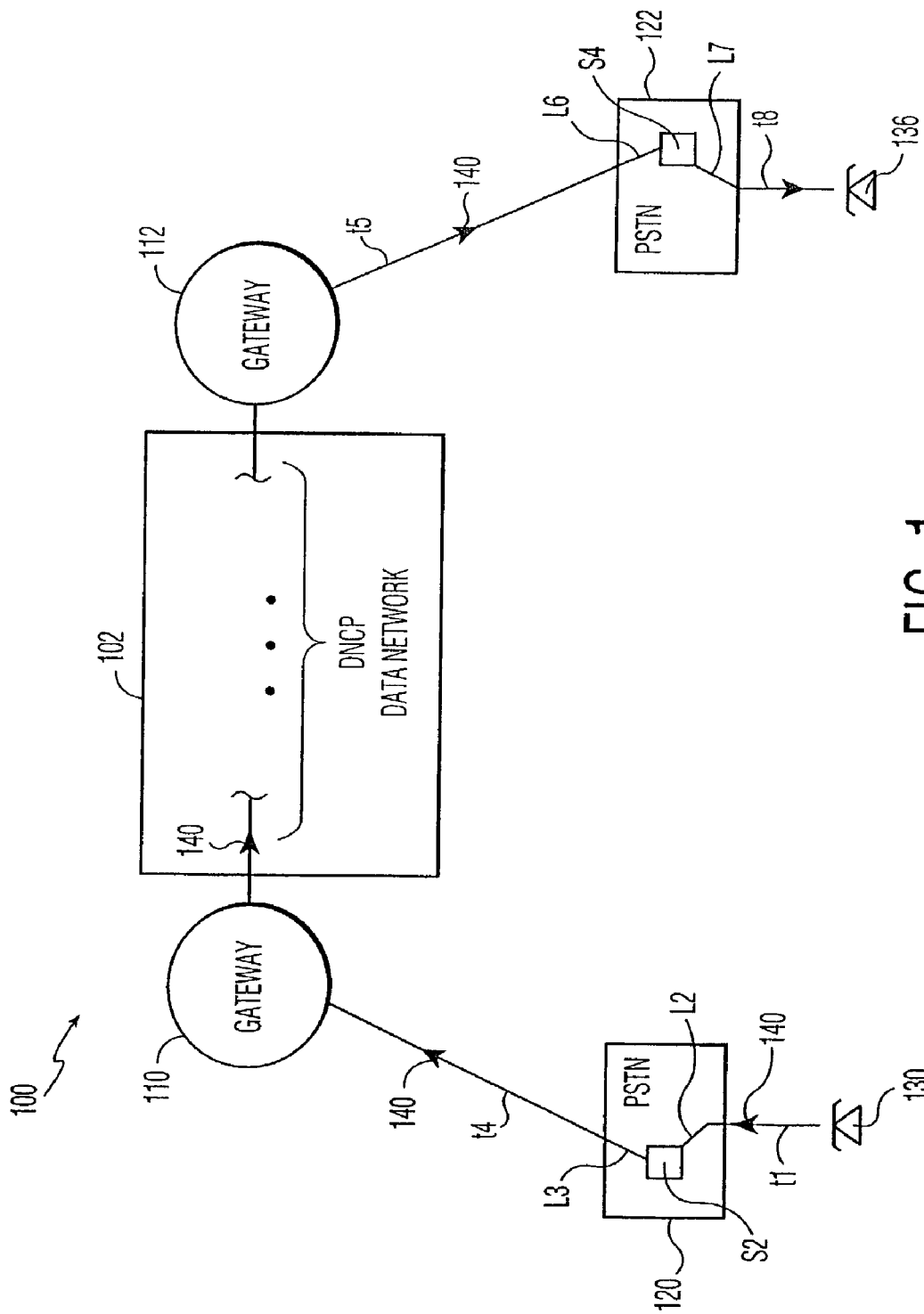
FIG. 1 depicts voice communications over a data network in the prior art.
Figure 2:
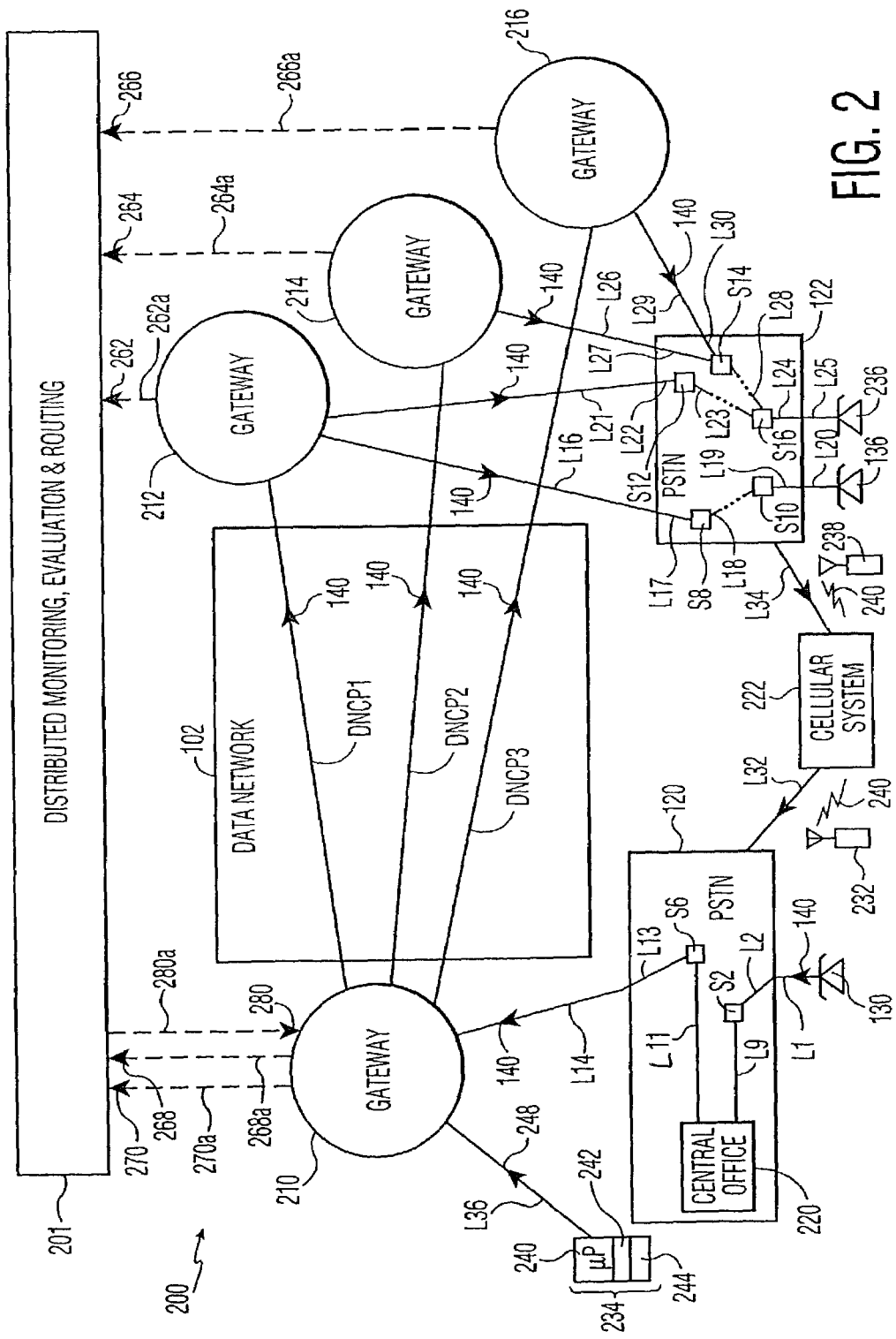
FIG. 2 depicts a high-level schematic diagram of a data network-based telephony system in accordance with an illustrated embodiment of the present invention.

FIG. 2 depicts a portion of data network-based telephony network ("DNT") 200 in accordance with an illustrated embodiment of the present invention. From a high-level perspective, the present network comprises a distributed monitoring, evaluation and routing (DiMER) system 201 that is used in conjunction with elements of a standard network-based telephony network such as network 100 depicted in FIG. 1. Such standard elements include "gateways" that facilitate communications between PSTNs and data networks (see Background section). As described further below, the "intelligence" imparted from DiMER system 201 to "originating" gateways, among other network elements, distinguishes the performance and operation of such gateways and DNTs incorporating the same, from those in the prior art.

The depicted portion of illustrative DNT 200 includes, among other elements, DiMER system 201, data network 102, two PSTNs 120 and 122, four gateways 210, 212, 214 and 216, and three wire-line telephones 130, 136 and 236, interrelated as shown. Gateway 210 serves as an interface between PSTN 120 and data network 102. Similarly, gateways 212, 214 and 216 function as an interface between data network 102 and PSTN 122. Telephone 130 is accessible over PSTN 120, and telephones 136 and 236 are accessible over PSTN 122.

Gateway 210 is depicted as an originating gateway, and gateways 212, 214 and 216 are depicted as terminating gateways. As previously indicated, the designation "originating" or "terminating" applies on a call-by-call basis, such that each gateway may be both an originating gateway and a terminating gateway as a function of where the call originates and where it terminates. For clarity of explanation, originating and terminating gateways will, however, be treated as separate elements. Furthermore, it is understood that communication is bidirectional. It will be appreciated that implementations of the present network will typically contain more gateways (scattered across the world) than the four gateways depicted in DNT 200.

In operation, a calling party represented as telephone 130 calls into PSTN 120 over link t1, entering a destination telephone number for call or message 140. For the purposes of illustration, the called telephone number corresponds to telephone 236.

Within PSTN 120, call 140 is carried over link L2 to switch S2, which, in one embodiment, is assumed to be a client of the administrator of data network-based telephone network in accordance with the present teachings. In such an embodiment, switch S2 routes call 140 to the administrator's central office 220 over link L9. In alternative embodiments, a call can be placed directly into central office 220. Central office 220 routes call 140 over link L11 to switch S6, which is advantageously controlled by the aforementioned administrator.

In some embodiments, switch S6 includes "unified routing information." In prior art DNTs, routing across the PSTN (e.g., switches) is treated separately and independently from the routing through the data network. The unified routing information of the present invention, advantageously provided in the form of a unified routing table, results from treating the PSTN and data network as elements of a single network. Unified routing provides an increased measure of control over the DNT in comparison with prior art systems. Such additional control can result in reduced costs to the administrator and/or increased control over call quality, among other benefits.

Based on the routing information in switch S6, call 140 is routed over links L13 and L14 to gateway 210. In some embodiments, the calling party at telephone 130 must be authenticated as a valid user before gaining access to gateway 210.

Having received a called telephone number, and a request to place such a call over a data network voice channel, gateway 210 generates or is provided with a list of termination gateways that can accept the call. In the illustrative embodiment depicted in FIG. 2, any of gateways 212, 214 and 216 can accept call 140 intended for telephone 236, as is shown by links L21, L26 and L29 that link such gateways, via switches S12, S14 and S16 in PSTN 122, to telephone 236. A call intended for telephone 136 must, however, be routed to gateway 212. From gateway 212, that call is routed over link L16 to switches S8 and S10 in PSTN 122 and then to telephone 136 over links L19 and L20.

The list of "acceptable" termination gateways can be generated solely by gateway 210, or, in other embodiments, in conjunction with other gateways. Prior art gateways are capable of generating a "list" of terminating gateways that are physically able to accept calls for a specified telephone number. Such a list may be "prioritized" wherein calls are initially routed to a first gateway. If the call can not be completed by the first gateway, the call is routed to a second gateway, etc. Unlike the prior art, and in accordance with the present invention, a call allocation is specified for acceptable gateways. Such an allocation may dictate that 30 percent of the calls are directed to a first gateway, 45 percent of the calls are directed to a second gateway, and 25 percent of the calls are directed to a third gateway.

In one embodiment, the call allocation is based on call metrics obtained from originating and terminating gateways and the analysis of such call metrics. In another embodiment, call allocation is determined as a function of call quality (as determined by the call metrics) as well as the price charged by the gateway for terminating the call. Call allocations are advantageously periodically updated (e.g., hourly) based on real time data regarding system performance (i.e., the call metrics).

Based on the call allocation data, which is again advantageously provided in the form of a unified routing table, originating gateway 210 selects a terminating gateway to which to route the call among the acceptable gateways. For example, among acceptable gateways 212, 214, and 216, the list may specify that terminating gateway 216 is allocated most of the calls, and it may be determined that at the present time it is appropriate to route call 140 thereto.

As routing through a data network does not follow a pre-defined path, the route taken through a network (i.e., from one network element to the next) from an originating gateway to a terminating gateway is not a priori known. As such, if problems arise, it may be very difficult to determine the cause/location of the problem. In the prior art, the cause or location of a problem is typically sought.

It is reasonably assumed, however, that the call path between an originating gateway and a first terminating gateway is different than the call path between the same originating gateway and a second terminating gateway. As such, and in accordance with the present invention, if a particular terminating gateway is having problems terminating calls (e.g., as determined from analysis of collected call metrics), calls are rerouted to another gateway. In other words, rather than trying to determine the cause/location of the problem as per the prior art, the call allocation among the gateways is changed.

Returning to the illustrative example (call 140 intended for telephone 236, after protocol conversion, etc., call 140 is routed to gateway 212, 214, and 216 as appropriate, over respective call paths DNCP1, DNCP2 and DNCP3. Assuming that call 140 is sent to gateway 216, that gateway performs the protocol conversion, etc., and directs the call over link L29 to PSTN 122. In PSTN 122, call 140 is routed to switch S14 over link L30, and from there to switch S16 over link L28. Finally, call 140 is routed out of PSTN 122 via link L24, and delivered to telephone 236 over link L25.

In addition to connecting calls between wireline telephones, the present system and method is useful in conjunction with cellular telephones, such as cell phones 232 and 238 that are depicted in FIG. 2. In particular, if a call 240 is placed by cell phone 232, that call is carried over cellular system 222 in well known fashion and enters PSTN 120 over link L32. Call 240 is then processed as previously described and is routed from PSTN 122 into cellular system 222 and to cell phone 238. Of course, a call may likewise be placed between a cell phone and a wireline telephone, so that only a single entry into cellular system 222 is necessary.

In a further embodiment, the present system and method is used in conjunction with a "pc-phone" or like device that bypasses PSTN 120. In an illustrated embodiment, pc-phone 234 comprises a processor 240 running appropriate software, speakers 242 and microphone 244. Call 248 from pc-phone 234 is carried over link L36 to "gateway" 210. Actually, the call from such a pc-phone typically bypasses the gateway and is directed, at least in some embodiments, to a gatekeeper (not shown). As previously noted, as used herein, the term "gateway" incorporates the functions of a "gatekeeper."

As previously noted, after the call is terminated, quality-related metrics information pertaining to the call is transmitted from the terminating gateway (e.g., gateway 216), and, in some embodiments, call quality is determined by DiMER system 201 from call metrics 262, 264, 266, 268 that are carried over links 262a, 264a, 266a and 268a to DiMER system 201. Likewise, the routing information that is generated by DiMER system 201 is based, for example, on such call quality, cost information and current route information 270 carried over link 270a from originating gateway 210. Routing information 280 developed by DiMER system 201 is transmitted to originating gateway 210 over link 280a.

Having described the manner in which a call is placed over the present telephony network and the data flow between the "standard" network elements and those of distributed monitoring and evaluation system 201, it is now appropriate to describe, in detail, DiMER system 201 and its operation. The description proceeds with reference to FIGS. 3A-6.

Figure 3A:
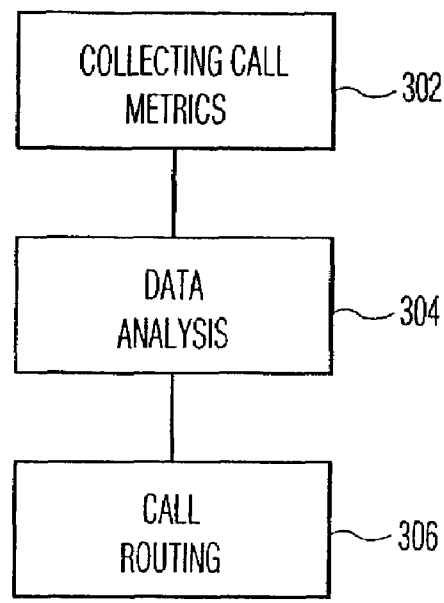
FIG. 3A depicts a high-level flow diagram of an illustrative method for implementing the monitoring, evaluation and routing functions of the system to operating the present network.
Figure 3B:
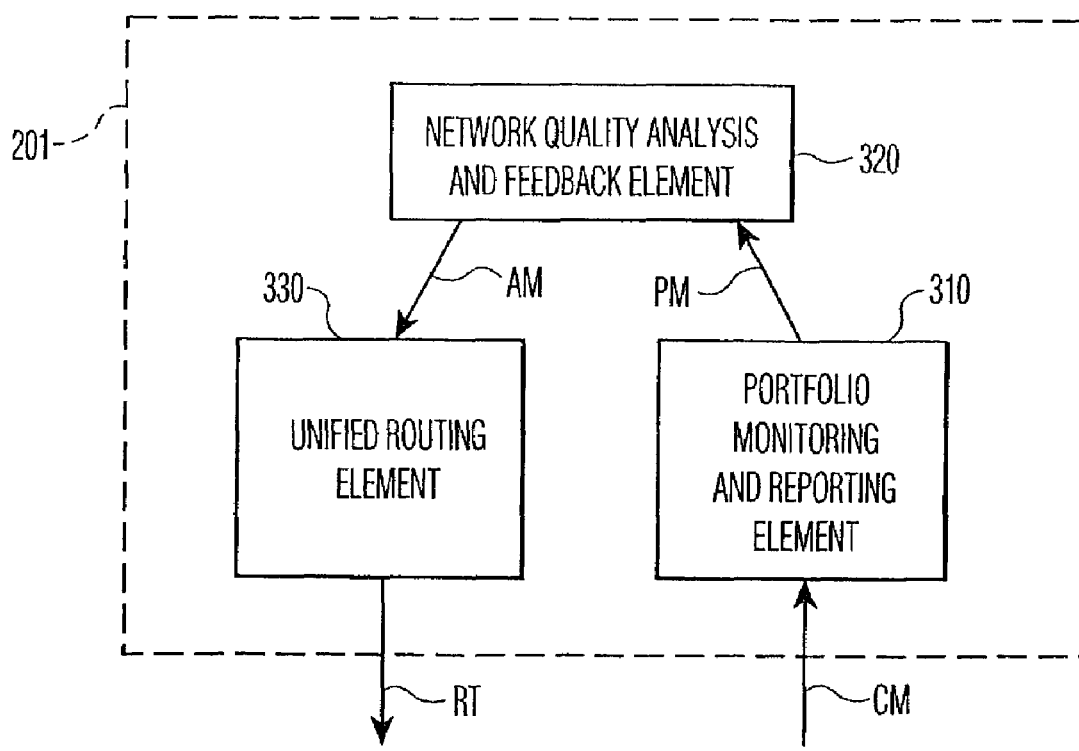
FIG. 3B depicts a high-level schematic diagram of basic functional elements of an illustrative distributed monitoring, evaluation and routing system in accordance with the present teachings.
Figure 4:
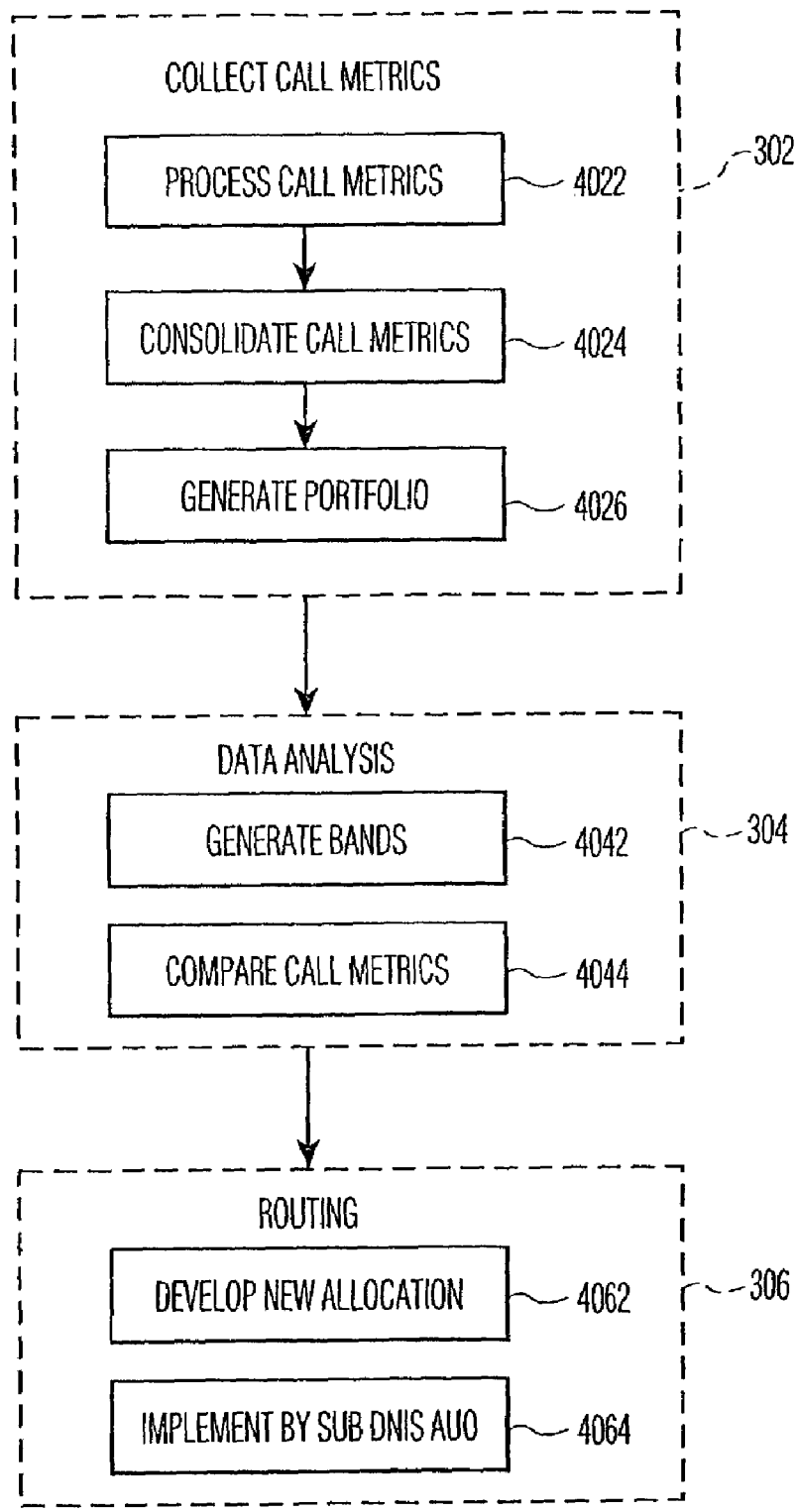
FIG. 4 depicts further illustrative operations comprising a method of operation in accordance with the present invention

FIGS. 3A and 3B provide a "high-level" depiction of the functional operation and organization of DiMER system 201. In particular, FIG. 3A depicts a high-level flow-diagram of a method of operation for an illustrative embodiment of DiMER system 201, and FIG. 3B depicts a schematic diagram of basic functional elements for implementing such operations. FIG. 4 depicts more detail of illustrative operations that comprise a method of operation in accordance with the present invention, FIG. 5 depicts additional information concerning an illustrative architecture of one of the basic functional elements shown in FIG. 3B, and FIG. 6 depicts further information concerning an illustrative architecture of DiMER system 201.

Figure 5:
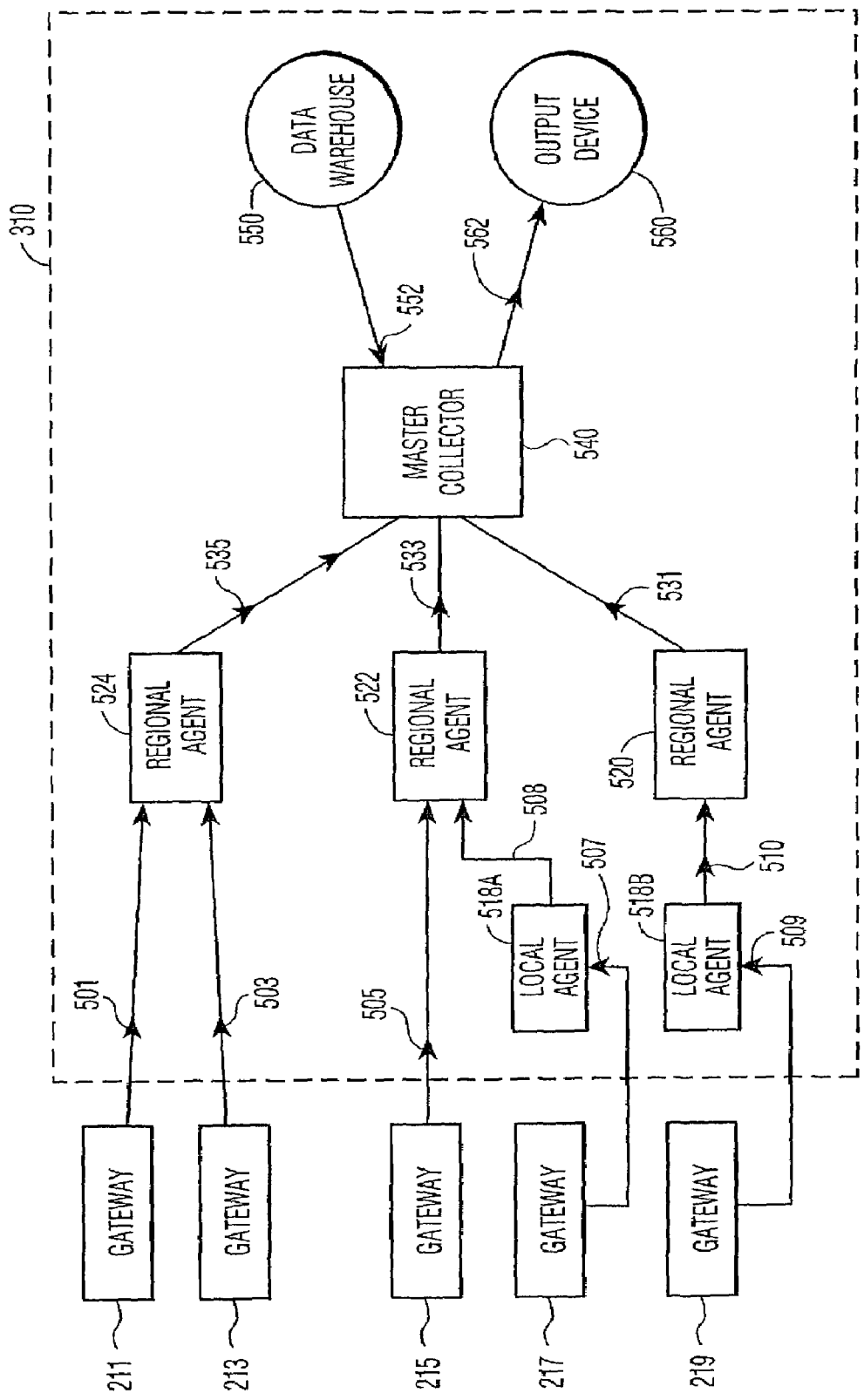
FIG. 5 depicts further detail of one of the basic functional elements shown in FIG. 3B.
Figure 6:
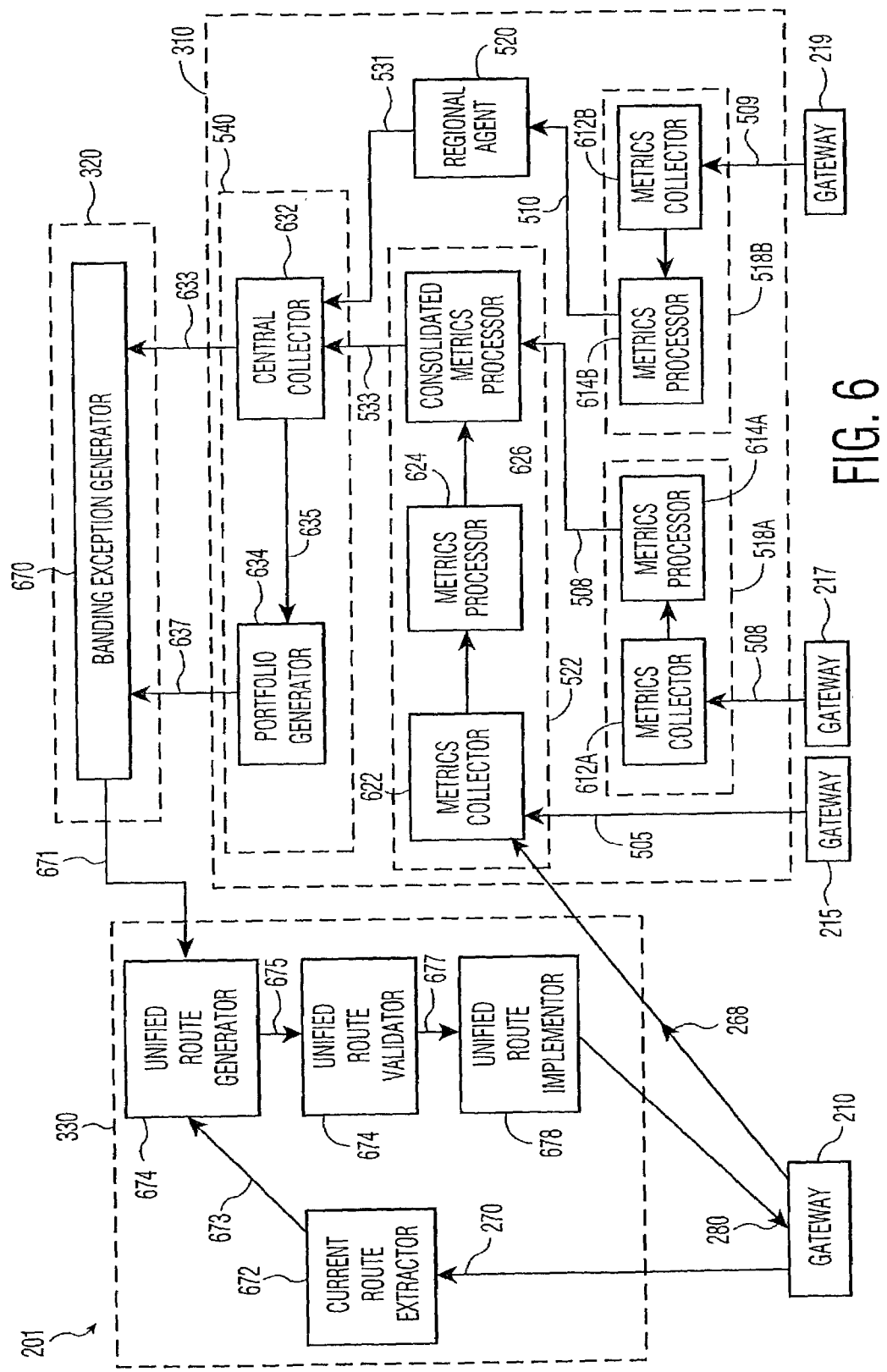
FIG. 6 depicts further detail of the basic functional elements shown in FIGS. 3B and 5.

It will be understood that architecture depicted for DiMER system 201, such as that depicted in FIGS. 3B, 5, 6, etc., is merely illustrative. Such architecture, and the association of specific functions therewith, is for pedagogical purposes and for clarity of presentation. As a result of its "distributed" nature, DiMER system 201 may advantageously be organized in a wide variety of ways as will occur to those skilled in the art to provide active management.

In an illustrative embodiment, DiMER system 201 provides a data acquisition functionality, a data analysis functionality and a call routing functionality. Such functionalities are depicted in the flow diagram of FIG. 3A as collecting call metrics 302, data analysis 304, and call routing 306. In view of such functionality, it is convenient to organize, at least conceptually, DiMER system 201 into three modules or elements for accomplishing such functions. Thus, in the illustrated embodiments, DiMER system 201 comprises a data acquisition element, a data analysis element, and a call routing element.

In an embodiment depicted in FIG. 3B, such an architecture is realized by portfolio monitoring and reporting element 310, network quality analysis and feedback element 320 and unified routing element 330. Call metrics CM are obtained by portfolio monitoring and reporting element 310 from originating and terminating gateways (not depicted in FIG. 3A). After suitable processing, process metrics PM are delivered to network quality analysis and feedback element 320 for data analysis. Analyzed metrics AM are received by unified routing element 330 for generating revised routing tables. The revised routing tables RT, which are advantageously unified routing tables, are provided to originating gateways and, in some embodiments, to switches controlled by the network administrator (not depicted in FIG. 3B).

In the illustrative embodiments depicted in FIGS. 5 and 6, portfolio monitoring and reporting element 310 includes, among other elements, "local agents" (e.g., local agent 518A and 518B), "regional agents" (e.g., regional agents 520-524), and a "master collector" 540. In other embodiments, local agents are not used; rather, only regional agents and a master collector are used. As previously indicated, the "local agent" and the "regional agent" (and other functional elements, as well) are, at least in one embodiment, software that performs the functions attributed to such elements.

In the illustrated embodiments, portfolio monitoring and reporting element 310 performs call metrics collection operations 302. Although it is not depicted in the Figures, the illustrated architecture provides, in one embodiment, for a relatively greater number of widely-scattered local agents to report to a relatively smaller number of regional agents. For example, a regional agent located in Japan may monitor all local agents in Asia. The regional agents, in turn, report to a single master. Such a hierarchy, which proceeds from "local" (greatest in number)->"regional" (fewer in number)->"master," (one in number) is a suitable approach for call metrics collection, processing, etc., in networks having a wide geographic coverage. It will be understood that other architectures may suitably be used for portfolio monitoring and reporting element 310.

Moreover, it may be advantageous to use a different architecture for portfolio monitoring and reporting element 310 when used in conjunction with data network-based telephony networks having less extensive geographic coverage or otherwise configured in a different manner than the illustrative network. It is within the capabilities of those skilled in the art, having the benefit of the present teachings, to develop and implement such different architectures.

Regarding call metrics collection operation 302, such call metrics are advantageously collected from all of the gateways (originating and terminating) in the data network-based telephony network. As described in more detail later in this Specification, such call metrics provide an indication of network performance and provide the basis for routing changes that are generated by unified routing element 330. In the illustrative embodiments of DiMER 201 that are depicted in FIGS. 5 and 6, metrics collection is performed by "local agents" 518A (reporting to "regional agent" 522) and 518B (reporting to "regional agent" 524) or directly by regional agents 522 and 524.

More particularly, in FIG. 5, call metrics 501 from gateway 211, and call metrics 503 from gateway 213 are reported directly to regional agent 524. Call metrics 505 from gateway 215 is reported to regional agent 522. Local agent 518A receives call metrics 507 from gateway 217, advantageously provides preliminary processing of such call metrics 507, as described in more detail later in this Specification, and provides processed call metrics 508 to regional agent 522. Local agent 518B receives call metrics 509 from gateway 219, and reports processed call metrics 510 to regional agent 520.

FIG. 6 provides further illustrative architectural details, wherein metrics collection from gateway 217 to local agent 518A is implemented via metrics collector 612A, and metrics collection from gateway 219 to local agent 518B is implemented via metrics collector 612B. In some embodiments in which DiMER 201 does not utilize local agents, call metrics are provided directly from a gateway, such as gateway 215, to an appropriate regional agent, such as regional agent 622. It should be understood that while only two regional agents are depicted in FIG. 6, portfolio monitoring and reporting element 310 will typically comprise many more of such regional agents, as a function of the geographic scope of the network. Likewise, in embodiments in which portfolio monitoring and reporting element 310 comprises local agents, many more than the two such local agents depicted in FIG. 6 will typically be used.

Local agent 510 can be located "at" a gateway. Such an agent is referred to herein as an "in-situ" local agent. In one embodiment, an in-situ local agent is realized as software running on a processor that is an element of a gateway. Alternatively, local agents can be situated at a remote location (e.g., software running on a processor that is physically remote from the gateway but in communication therewith).

Collected call metrics retrieved from gateways include, without limitation, data suitable for evaluating average call duration, average percent call completion and average "port" utilization (each gateway has a plurality of ports (e.g., 20) available for completing a call). It will be appreciated that the metrics listed above may be derived quantities that are calculated from "raw" data. It is within the capabilities of those skilled in the art to collect such raw data and to determine the specific data to be collected. In some embodiments, such average call duration metrics are not received directly from the gateways, but rather from a data storage site (e.g., data warehouse 550, see FIG.5).

To facilitate analysis of the collected call metrics (operation 304), such call metrics are advantageously "processed" in accordance with operation 4022 (see FIG. 4). Such processing involves summarizing or organizing the collected call metrics. It will be appreciated that the data is advantageously organized or processed to facilitate transmission of that data, in some embodiments, processed in a way that is most appropriate for the analysis method adopted in operation 304. In the illustrated embodiments, such analysis is performed via "banding." As will become clearer later in this specification, the call metrics are advantageously organized, at least in part, on "per gateway" basis to facilitate analysis via banding.

In illustrative embodiment of DiMER 201 depicted in FIG. 6, metrics retrieved by local agents are processed therein via a "metrics processor." In particular, metrics processor 614A in local agent 518A processes call metrics collected by call metrics collector 612A, and metrics processor 614B in local agent 518B processes call metrics collected by call metrics collector 612B. In embodiments in which regional agents, such as regional agent 522, directly retrieve call metrics via a call metrics collector (e.g., collector 622), such call metrics are processed via an associated call metrics processor (e.g., processor 624) within the regional agent.

In large networks, the processed call metrics may benefit from some amount of "consolidation" before analysis. In the illustrative architecture of DiMER 201 depicted in FIG. 6, a consolidation operation 4024 (FIG. 4) is performed by regional agents, such as regional agents 522 and 520, in a consolidated metrics processor, such as processor 626 associated with regional agent 522 (consolidate metrics processor not shown for regional agent 520).

Thus, call metrics (e.g., call metrics 505) obtained (and processed) directly by a regional agent (e.g., regional agent 522), or that are obtained by the regional agent indirectly through local agents, are "consolidated" for ease of transmission, etc.

Consolidated processed metrics (e.g., 531, 533, etc.) are provided to master collector 540 (FIGS. 5 and 6). Central collector 632 within master collector 540 receives consolidated processed metrics from all regional agents in the system. Consolidated processed metrics 635 are delivered to portfolio generator 634 in master collector 540. As depicted in FIG. 5, master collector 540 is advantageously in communication with output device 560, which can be, for example, a display monitor or the like device for displaying collected data.

As DiMER 201 advantageously generates revised routes by shifting call traffic between acceptable gateways, data is advantageously organized in a way that facilitates such shifting. To that end, and in accordance with operation 4026 (FIG. 4) of an illustrative embodiment of the present invention, a plurality of "portfolios" are generated from the consolidated processed metrics by a "portfolio generator." In FIG. 6, portfolio generator 634 is depicted as being located in master collector 540.

Each portfolio provides "statistics" for one "DNIS." "DNIS" is an acronym for Dialed Number Identification Service. While often defined as a feature of 800 and 900 lines, the term "DNIS" is used herein to refer to a set of digits defining a dialing plan. For example, in the phone number (732) 555-1212, the digits "732" form an illustrative DNIS. Thus, the DNIS "732" includes all telephone numbers having the area code "732." Each DNIS may further comprise a plurality of "sub-DNIS." Given a DNIS "732," there are potentially ten sub-DNIS "732x." Thus, 7321, 7322, 7323, 7324, 7325, 7326, 7327, 7328, 7329 and 7320 are all sub-DNIS of the DNIS "732." The sub-DNIS "7325," for example, includes all telephone numbers having the area code "732" and having an exchange that begins with the digit "5". And, in turn, the sub-DNIS "7325" can be divided into sub-DNIS "7325x," and so forth.

The statistics provided by a portfolio include a call breakdown on a per-gateway basis. In other words, given the total calls for a particular DNIS, and given all gateways that terminate calls for the DNIS, the portfolio provides the percentage of calls terminated by each such gateway. Table I provides an illustrative portfolio for the DNIS "201."

TABLE I

Illustrative Portfolio for DNIS 201-

| Gateway | % of Call Traffic |
|---|---|
| GW1 | 20 |
| GW2 | 30 |
| GW3 | 40 |
| GW4 | 10 |

Thus, for the example of Table I, gateway GW1 terminates twenty percent of the calls having the DNIS "201." Similarly, gateways GW2, GW3 and GW4 terminate thirty, forty and ten percent, respectively, of the calls having the DNIS "201." The portfolio thus converts the collected call data from a "gateway-centric" view to a "DNIS-centric" view. In some embodiments, a portfolio is based on a combination of historical and real-time data (e.g., the real-time data is "blended" in to adjust historical allocations).

Consolidated call metrics 633 are provided to network quality analysis and feedback element 320 for analysis operation 304. In accordance with the present teachings, such "analysis" is advantageously performed via "banding," operation 4042 and comparison operation 4044 (see FIG. 4). In the embodiment depicted in FIG. 6, banding is performed by banding exception generator 670 in network quality analysis and feedback element 320.

"Banding" defines an acceptable range for a given call metric at a given gateway or per DNIS as a function of time (e.g., hours of the day, days of the week, weeks of the month, etc.). The "acceptable range" for a specific call metric is developed using historical data, which, in an illustrated embodiment, is available as historical data 552 from data warehouse 550 (see FIG. 5).

Consolidated call metrics 633, which advantageously provide network performance on a time basis, are compared (e.g., operation 4044 in FIG. 4) to the band defining acceptable performance. In such a manner, unacceptable performance is readily identified. Banding/comparison thus provides a terminating gateway's or DNIS's performance, as a function of time, for a specific call metric. The call metrics that are analyzed via the banding operation include, without limitation, percent call completion, average call duration and port utilization. As such call metrics are analyzed on a common basis (e.g., time), they can be considered in combination (e.g., applying weighting factors, etc.) to develop a single quality-assessment parameter.

Figure 7:
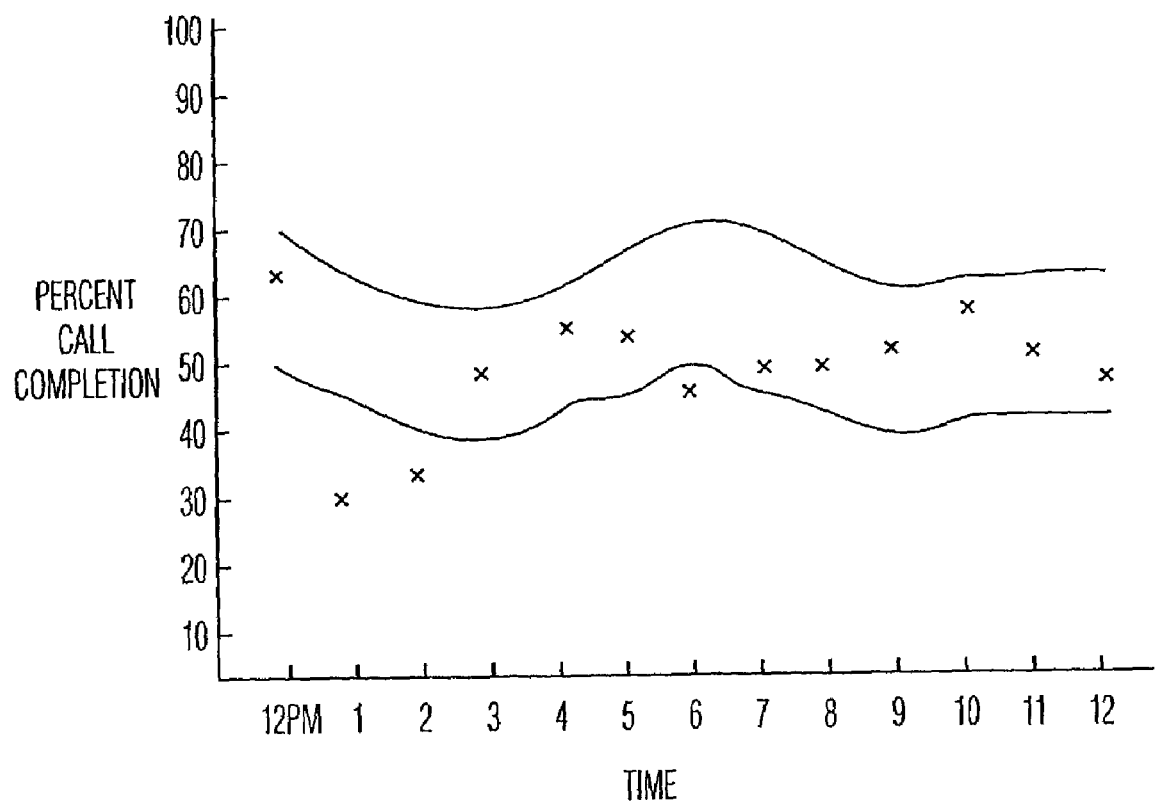
FIG. 7 depicts an illustrative example of banding.

An example of banding is depicted in FIG. 7, wherein percent call completion data is banded for a given gateway. The illustrative data used for the plot depicted in FIG. 7 is provided below in Table II.

TABLE II

Data for Banding Example of FIG. 7

| Time | Upper Limit | Lower Limit | % Compl. | Out of Band |
|---|---|---|---|---|
| 12 p.m. | 70 | 50 | 65 | No |
| 1 p.m. | 65 | 45 | 30 | Yes |
| 2 p.m. | 60 | 40 | 35 | Yes |
| 3 p.m. | 60 | 40 | 50 | No |
| 4 p.m. | 65 | 45 | 57 | No |
| 5 p.m. | 67 | 45 | 55 | No |
| 6 p.m. | 70 | 50 | 47 | Yes |
| 7 p.m. | 67 | 47 | 49 | No |
| 8 p.m. | 65 | 45 | 50 | No |
| 9 p.m. | 60 | 40 | 55 | No |
| 10 p.m. | 65 | 45 | 60 | No |
| 11 p.m. | 65 | 45 | 55 | No |
| 12 a.m. | 65 | 45 | 50 | No |

TABLE II-continued

Data for Banding Example of FIG. 7

The banding operation for the illustrated gateway indicates the percent call completion is "out-of-band" (i.e. sub-standard) at 1 p.m., 2 p.m. and 6 p.m. for the illustrated gateway. The banding operation for other gateways (not illustrated), indicates that percent call completion is "in-band" (i.e., meets standards) at 1 p.m., 2 p.m. and 6 p.m.

Thus, data for each reporting gateway is "banded," in accordance via operations 4042/4044. The banding data, which, as indicated above, may be on a gateway basis, is cross correlated with the portfolios to relate DNIS to Gateways.

The portfolios (generated in portfolio generation operation 4026 of FIG. 4) and the results of banding (generated in analysis operation 304), collectively referenced as data 671 (see FIG. 6), are provided to unified routing element 330 to generate new routings per operation 306. In accordance with the illustrated embodiments, the new routings are developed by generating a new gateway allocation, as per operation 4062. The allocation is implemented via operation 4064 by sub-DNIS allocation, as described below.

In the illustrative architecture depicted in FIG. 6, data 671 is received by unified route generator 674. Moreover, in the embodiment depicted in FIG. 6, current routing information 270 is extracted via current route extractor 672 from gateway 210 and provided to unified route generator 674.

Based on the banding data, portfolio information and current routing information 270, a revised call-traffic allocation between gateways for each DNIS is developed. In addition to using call quality, such as may be obtained from the banding/comparison operations, as a basis for call-traffic re-allocation, cost data and other factors can be considered as well. In one embodiment, the revised allocation is based on both call quality and cost. It is within the capabilities of those skilled in the art to develop algorithms that apply appropriate weighting factors, based on company policy/goals, to quality data, cost data and any other parameters appropriate for consideration when re-allocating call traffic between gateways. Such routing table revisions can be performed on a periodic basis (e.g. hourly) to reflect network performance as determined by the banding operation.

Table III below provides illustrative data showing current routing information and a re-allocation of call traffic between gateways for a given DNIS in accordance with the present teachings.

TABLE III

Illustrative Call Routing Guidelines
Percent of Call Traffic for DNIS 609

| Gateway | Current Routing | Revised Routing |
|---|---|---|
| GW1 | 20 | 10 |
| GW2 | 40 | 35 |
| GW3 | 30 | 40 |
| GW4 | 10 | 15 |

In one embodiment, the revised allocation is implemented using historical data that provides sub-DNIS for the DNIS under consideration, as per operation 4064. An example of such historical data is provided below in Table IV.

TABLE IV

Distribution of Call Attempts for 609χ

| Sub-DNIS | % Distribution |
|---|---|
| 6091 | 10 |
| 6092 | 20 |
| 6093 | 10 |
| 6094 | 10 |
| 6095 | 20 |
| 6096 | 5 |
| 6097 | 5 |
| 6098 | 15 |
| 6099 | 5 |

Thus, one way to implement the revised allocation shown in Table III is to allocate sub-DNIS 6096 and sub-DNIS 6097 to GW1 (10%); sub-DNIS 6091, 6092 and 6099 to GW2 (35%); sub-DNIS 6093, 6094 and 6095 to GW3 (40%) and sub-DNIS 6098 to GW4 (15%).

Figure 8:
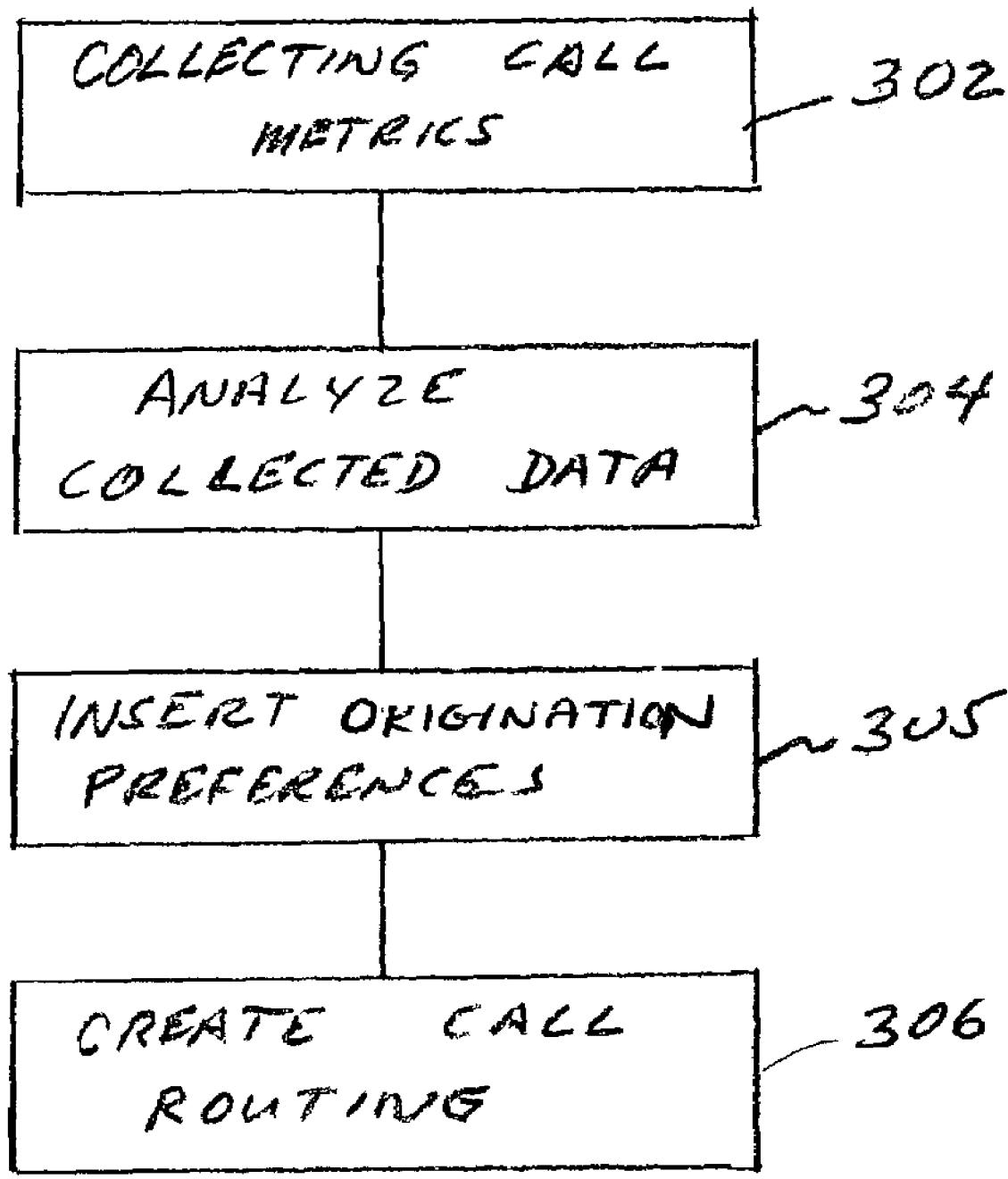
FIG. 8 depicts a high-level flow diagram for the collecting, analyzing, inserting and routing functions in accordance with a further embodiment of the present teachings.
Figure 9:
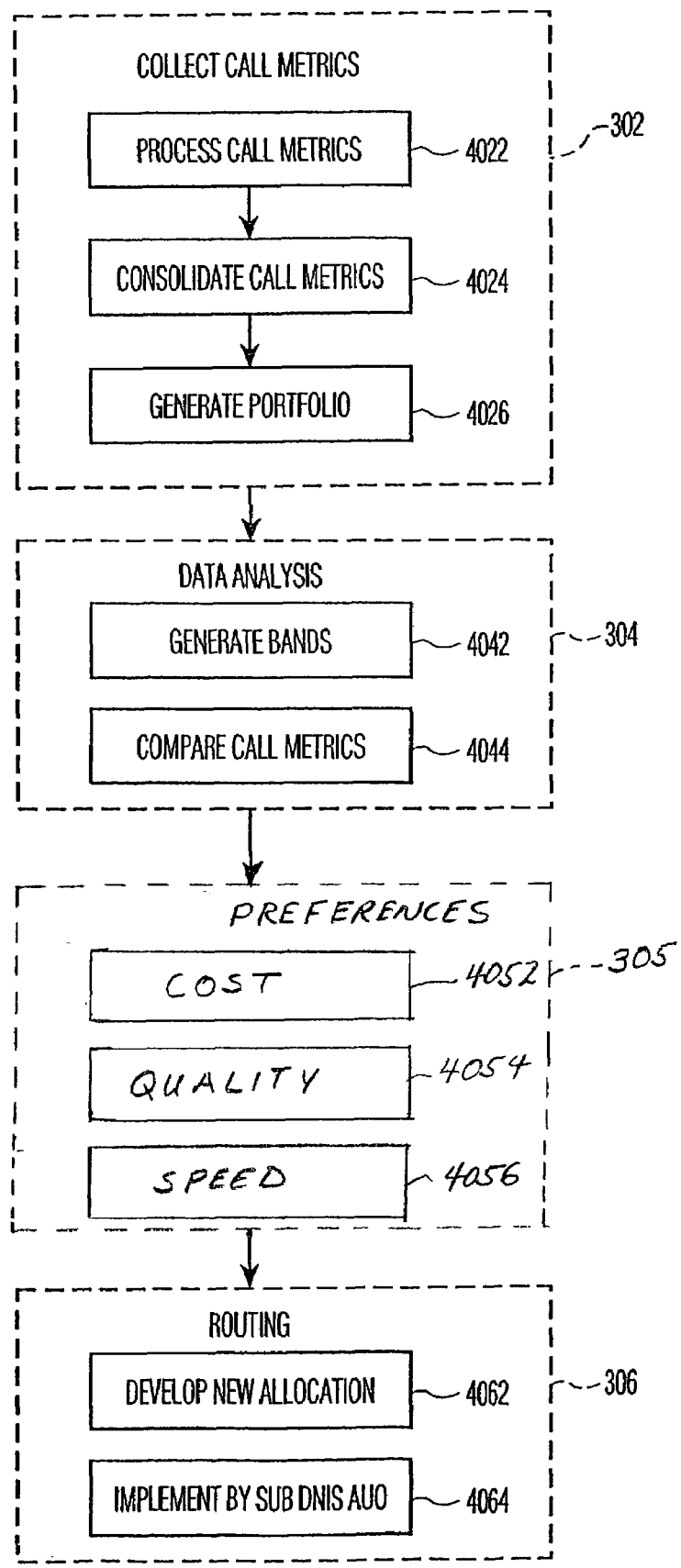
FIG. 9 depicts additional detail of the operations comprising a method of call routing allocation according to the further embodiment of the present invention.
Figure 10:
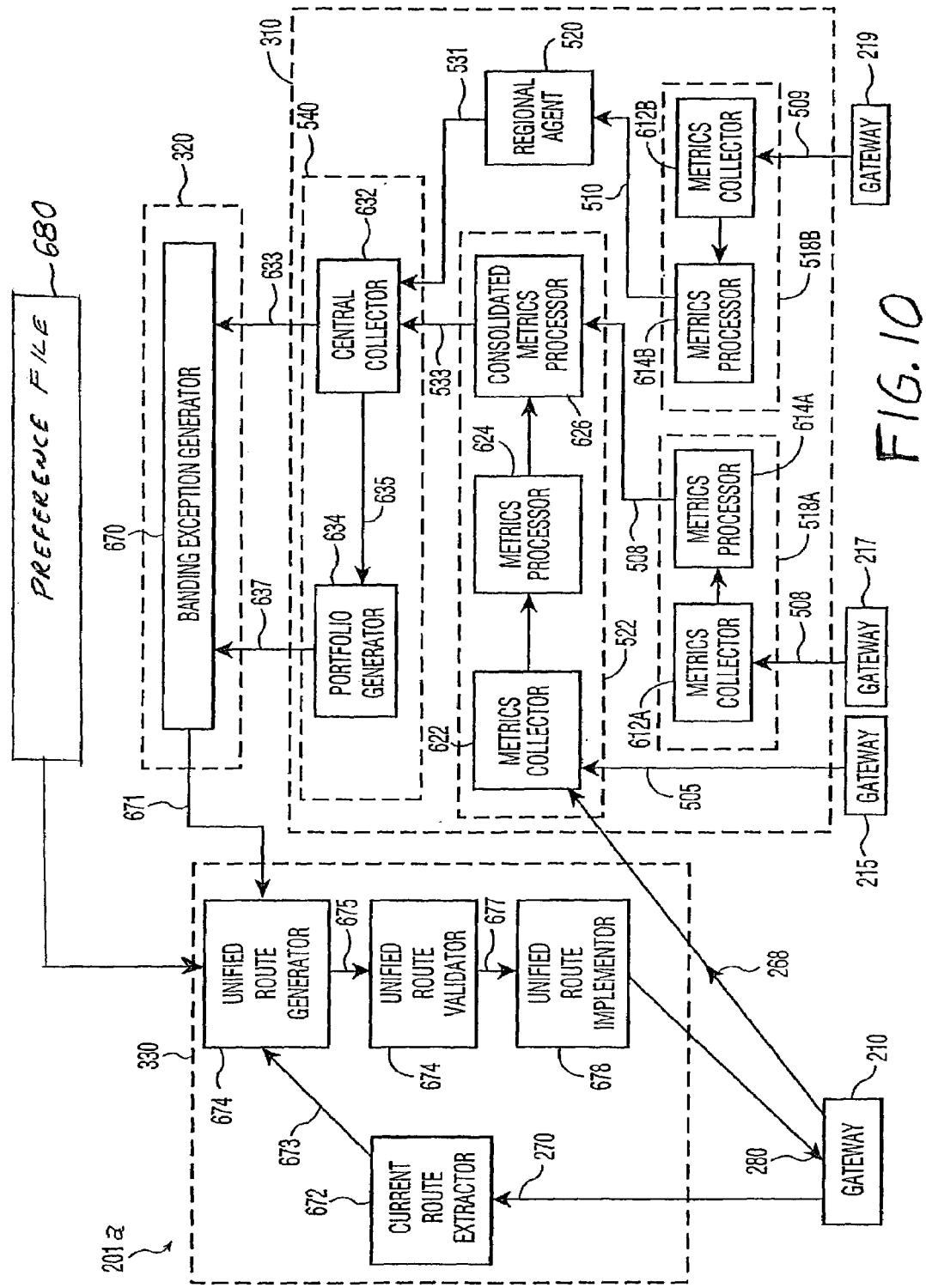
FIG. 10 depicts details of the functional elements of the further embodiment system disclosed.

A further aspect of the present invention is illustrated in accompanying FIGS. 8, 9 and 10. FIG. 8 depicts a high-level flow chart of the process by which various data are utilized and combined in the determination of a best call routing. Call metrics, for example length of call, time of call, calling party and called party locations, PSTN location, originating and terminating gateways are collected and archived in step 302. In step 304, the collected data are analyzed and interpreted for acceptability in relation to a previously created band of limits. According to this embodiment of the invention, each originating gateway, or customer thereof, is able to establish various parameters for selecting a routing to be used when the system user places a call as applied onto metrics obtained and analyzed as described above. The origination preferences are inserted into the routing determination operation at step 305, combined with collected data and a call routing preference from the originating gateway to one of the available plurality of terminating gateways at step 306.

The origination preferences may be different for the same terminating gateway, at different originating gateways. For example, any particular originating gateway may have a maximum cost per minute as it is willing to incur regardless of quality. A different originating gateway may have a different maximum costs, or no maximum cost at all, while other gateways may have restrictions on quality of service.

The routing to a specified DNIS may be different among various originating gateways. The specific origination preferences may be determined by a particular carrier, a switch, or by the originating gateway itself.

FIG. 9 provides an amplification of the process steps described above in relation to the FIG. 8 flow chart. The details of process steps 302, 304 and 306 are discussed above. Step 305, the insertion of preferences, is subdivided, by way of example, into a preference for call cost per minute in box 4052, a preference for maximized transmission quality in box 4054 and a preference for fast connection time in box 4056. In each of boxes 4052, 4054 and 4056, the preference is graded by the system user in order of priority. That is, if cost is the most important factor, cost is given a high priority; if transmission quality is more important, and cost is relatively less important, transmission quality is graded higher, etc. In this way, the preference of the originating gateway or other entity is overlaid on the metrics of call completion and success that has been collected and charted in the invention system and a routing that most fits the originating gateway or switch is established. As noted above, the actual path by which a series of digitized packets representing a call is transmitted is left largely to the protocol of the network involved. Caller preferences may be specified by a switch, a carrier, or an originating gateway, but usually would not be specified by a caller.

Referring now to FIG. 10, the preference file 680 is combined with the system illustrated in FIG. 6 above and described in relation thereto. As described above, metrics are developed through collection by, e.g. metrics collector 622, from a gateway 210 or 215, passed for processing at metrics processor 624, and transmitted through consolidated metrics processor 626 and central collector 632 to banding exception generator 320. Simultaneous with the consolidated metrics data being sent from banding generator 320 to unified route generator 674, a set of established calling party preferences are sent from caller preference file 680. Thus, a route is created and transmitted from unified routing element 330 to originating gateway 210, designating an allocation for a particular originating gateway.

As previously indicated, in the prior art, routing through the PSTN is performed without any consideration of the routing across the data network (i.e., originating gateway to terminating gateway). In accordance with some embodiments of the present invention, a switch and gateway (or trunk group) form a "cluster" and are jointly considered in developing a routing scheme. Such consideration results in improved efficiency and increased control over network performance. In embodiments wherein the originating gateways have different sets of allocations for the same terminating gateways, the allocation may be for a particular cluster, and may vary from cluster to cluster.

It is to be understood that the above-described embodiments are merely illustrative of the invention and that many variations may be devised by those skilled in the art without departing from the scope of the invention. It is understood that the term telephone call is used for explanation herein, but that as used herein, telephone calls are intended to include facsimile, data calls, etc. Also, the telephone may be implemented not in the form of a conventional telephone, but a computer telephony device, wireless device, etc. It is intended that such variations be included within the scope of the following claims and their equivalents.

What is claimed:

1. A telephone system comprising:
   a data network;
   an originating gateway operable to place a telephone call onto the data network;
   a plurality of terminating gateways operable to receive the call and route the call to a telephone;
   a data acquisition element for acquiring at least one call metric from each terminating gateway in the plurality of terminating gateways, wherein the at least one call metric comprises average call duration, percentage of call completion, port utilization, monetary cost, quality of service and speed of transmission;
   a portfolio generator for generating a portfolio that lists a percentage of calls terminated at each terminating gateway in the plurality of terminating gateways as a function of a DNIS and a time of each call; and
   wherein the originating gateway cross-correlates the at least one call metric with the portfolio to generate banding data and selects a terminating gateway in the plurality of terminating gateways and routes the call to the selected terminating gateway.

2. The system of claim 1, further comprising a central collector for collecting consolidated processed call metrics from the consolidated metrics processor.

3. The system of claim 1, further comprising a first PSTN, wherein the call is placed over the first PSTN to the originating gateway.

4. The system of claim 3, further comprising:
a second PSTN, wherein the call is carried by the second PSTN to the telephone.

5. The system of claim 1, further comprising:
a data acquisition element that acquires call metrics from the plurality of terminating gateways;
a data analysis element that receives the call metrics from the data acquisition element and compares the call metrics to historical data;
a file for storing established preferences of the originating gateway; and
a call routing element operable to:
receive results of the comparison; and
generate routing information based, in part, on the comparison and the established preferences of the originating gateway.

6. The system of claim 5, wherein the data acquisition element is operable to organize at least a portion of the call metrics into portfolios, wherein each portfolio provides, per DNIS, an allocation of call attempts to each terminating gateway in the plurality of terminating gateways.

7. The system of claim 5, wherein the data analysis element is operable to compare the call metrics to historical performance by:
using historical data to define a band of acceptable performance; and
determining whether the call metrics fall within the band.

8. A system for routing a call through a data network, comprising:
an originating gateway for routing the call into the data network;
a plurality of terminating gateways operable to receive the call and route the call to a telephone;
a data acquisition element for acquiring at least one call metric from each terminating gateway in the plurality of terminating gateways, wherein the at least one call metric comprises average call duration, percentage of call completion, port utilization, cost and quality of service;
a portfolio generator for generating a portfolio that lists a percentage of calls terminated at each terminating gateway in the plurality of terminating gateways as a function of a DNIS and a time of each call, and
wherein the originating gateway cross-correlates the at least one call metric with the portfolio to generate banding data, utilizes the banding data in combination with at least one of a monetary cost, a quality of service, and a speed of transmission of the plurality of terminating gateways to select a terminating gateway in the plurality of terminating gateways and routes the call to the selected terminating gateway.

9. The system of claim 8, wherein the originating gateway utilizes routing information to select the terminating gateway, the routing information specifying an allocation of call attempts between the originating gateway and each terminating gateway in the plurality of terminating gateways further comprising:
a data acquisition element that acquires call metrics associated with the terminating gateways;
a data analysis element that receives the call metrics from the data acquisition element and evaluates data network telephony performance by comparing the call metrics to historical performance;
a call routing element operable to:
receive the evaluated performance from the data analysis element; and
supply to the originating gateway updated routing information specifying another allocation of call attempts between the originating gateway and each of the terminating gateways.

10. A system for routing a call through a data network, comprising:
an originating gateway for routing the call into the data network;
a plurality of terminating gateways operable to receive the call and route the call to a telephone,
wherein the originating gateway selects a terminating gateway in the plurality of terminating gateways as a function of at least one of a monetary cost, a quality of service, and a speed of transmission and routes the call to the selected terminating gateway and stores an allocation of call attempts between the originating gateway and each of the terminating gateways in a routing table;
a data acquisition element that acquires call metrics associated with the terminating gateways;
a data analysis element that receives the call metrics from the data acquisition element and evaluates data network telephony performance by comparing the call metrics to historical performance;
a preference file for storage of the function of at least one of a monetary cost, a quality of service, and a speed of transmission related to the originating gateway; and
a call routing element operable to:
receive the evaluated performance from the data analysis element, select another terminating gateway in the plurality of terminating gateways based on the evaluated performance and the function of at least one of a monetary cost, a quality of service, and a speed of transmission, and supply to the originating gateway an updated routing table specifying another allocation of call attempts between the originating gateway and each of the terminating gateways,
wherein the data acquisition element comprises:
a first metrics collector that receives the call metrics originating from the originating gateway and the plurality of terminating gateways;
a second metrics processor that processes the call metrics into a form suitable for use by the data analysis element for analyzing the call metrics, and wherein the routing information specifies plural terminating gateways, the terminating gateways being reachable by different paths from a single originating gateway or from different originating gateways and wherein the routing information does not specify the path to be used through the network to reach the selected terminating gateway;
a consolidated metrics processor that consolidates processed call metrics received from the originating gateway and the plurality of terminating gateways; and
a portfolio generator for organizing collected consolidated processed call metrics by DNIS and for allocating a first portion of calls to a specified DNIS to one of the terminating gateways, a second portion of calls to a second of the terminating gateways, both first and second portions passing through one originating gateway.

11. A system for routing calls through a data network, comprising:

a plurality of originating gateways for routing the calls into the data network, the plurality of originating gateways operating under a plurality of respective sets of telephony parameters;

a plurality of terminating gateways operable to receive the calls and transmit the calls out of the data network;

a data acquisition element that acquires call metrics associated with the terminating gateways, a call routing element for establishing an allocation of calls, from each said originating gateway, among the terminating gateways, based on the telephony parameters of each said originating gateway and the acquired call metrics;

a consolidated metrics processor that consolidates processed call metrics received from the originating gateways and the plurality of terminating gateways a data analysis element that receives the call metrics from the data acquisition element and evaluates data network telephony performance by comparing the call metrics to historical performance; a preference file for storage of one or more the telephony parameters of each originating gateway, the one or more telephony parameters being selected from the group consisting of monetary cost, quality of service, and speed of transmission, said data analysis element also comprising a metrics collector that receives the call metrics originating from the originating gateways and the plurality of terminating gateways; and a metrics processor that processes the call metrics into a form suitable for use by the data analysis element for analyzing the call metrics; and a portfolio generator for organizing collected consolidated processed call metrics by DNIS and for allocating a first portion of calls to a specified DNIS to one of the terminating gateways, a second portion of calls to a second of the terminating gateways, both first and second portions passing through one originating gateway.

* * * * *